United States Patent [19]

Okuno et al.

[11] 3,971,050
[45] July 20, 1976

[54] ELECTRONIC FLASHLIGHT SYSTEM FOR CAMERAS

[75] Inventors: Keno Okuno, Kawasaki; Kouichi Takahata, Tokyo, both of Japan

[73] Assignee: Nippon Kogaku K.K., Tokyo, Japan

[22] Filed: July 24, 1974

[21] Appl. No.: 491,514

Related U.S. Application Data

[63] Continuation of Ser. No. 315,451, Dec. 15, 1972, abandoned.

[30] Foreign Application Priority Data

Dec. 25, 1971 Japan .................... 46-2928[U]

[52] U.S. Cl. .......................... 354/128; 354/145
[51] Int. Cl.[2] .......................................... G03B 15/05
[58] Field of Search .............. 95/11 R, 11 L, 11 V, 95/11.5 R; 354/127, 128, 145

[56] References Cited
UNITED STATES PATENTS

| | | | |
|---|---|---|---|
| 3,424,071 | 1/1969 | Schwahn | 95/11.5 R |
| 3,631,779 | 1/1972 | Hori et al. | 95/11.5 R |

*Primary Examiner*—L. T. Hix
*Assistant Examiner*—Kenneth C. Hutchison
*Attorney, Agent, or Firm*—Fitzpatrick, Cella, Harper & Scinto

[57] ABSTRACT

An electronic flashlight may be removably assembled to a camera. The camera is provided with a mounting member, an indicator lamp for indicating the readiness of the electronic flashlight for flashing, and contact means connected with the indicator lamp. The electronic flashlight is provided with a mounting member for engagement with the mounting member of the camera removably to secure the flashlight to the camera, and contact means. The contact means of the camera and the contact means of the flashlight may automatically be connected together upon assemblage of the flashlight to the camera electrically to connect the indicator lamp with the flashlight. The indicator lamp is located for observation through the viewfinder of the camera. When the camera indicator lamp, a glow discharge tube, is connected into the flashlight circuit by attachment of the flash unit to the camera, the flashlight indicator lamp, also a glow discharge tube, is automatically extinguished because of a resulting voltage decrease across a voltage dividing resistor.

1 Claim, 8 Drawing Figures

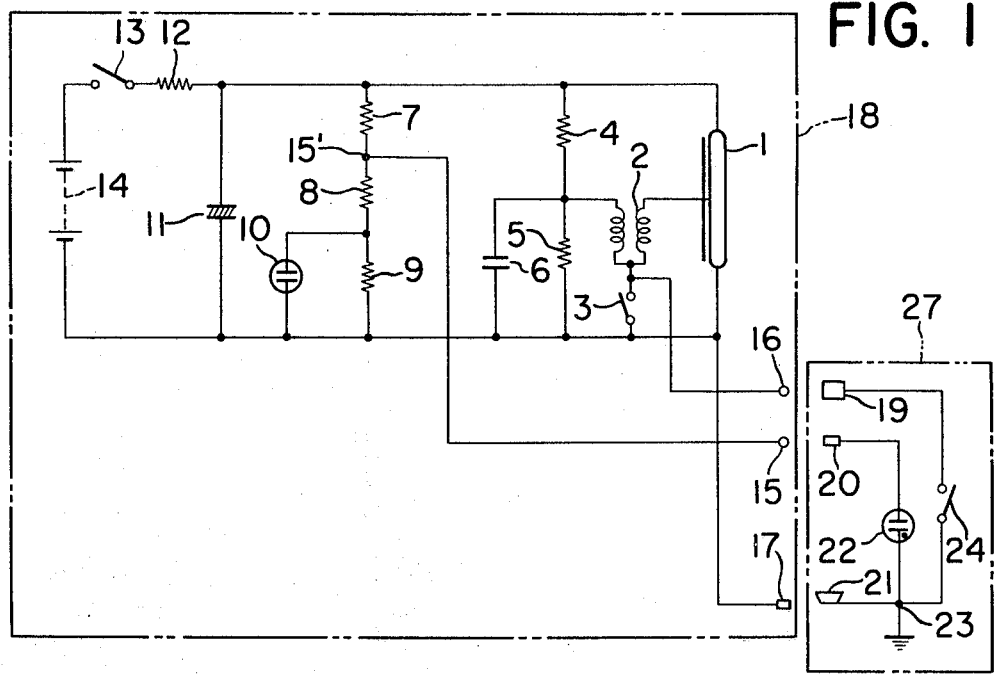
FIG. 1
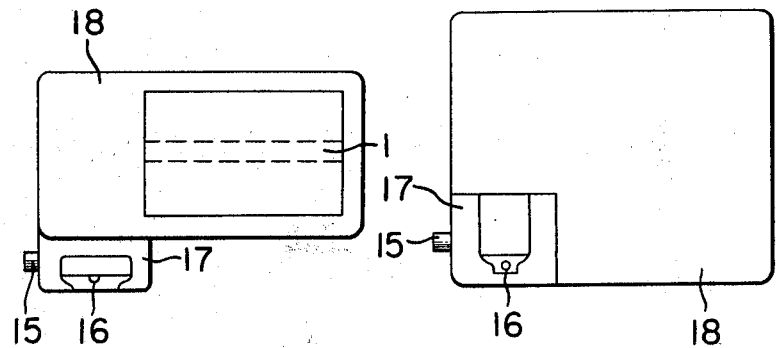
FIG. 2   FIG. 3
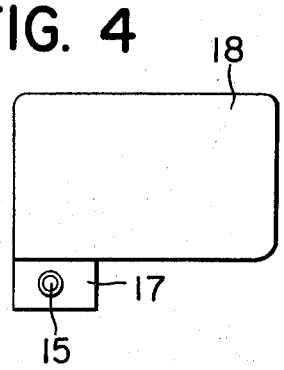
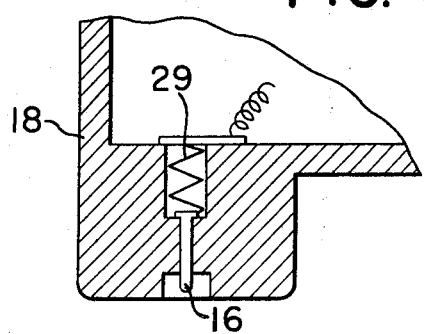
FIG. 4   FIG. 5

ELECTRONIC FLASHLIGHT SYSTEM FOR CAMERAS

This is a continuation of application Ser. No. 315,451, filed Dec. 15, 1972, now abandoned.

BACKGROUND OF THE INVENTION

1. Field of the Invention

This invention relates to an electronic flashlight system for use with a camera, and more particularly to an improvement according to which glow discharge tube type indicator lamp for indicating the readiness of the electronic flashlight for flashing is provided within the viewfinder of a camera.

2. Description of the Prior Art

In order to confirm the charged state of an electronic flashlight, i.e., the state in which the electronic flashlight is ready for flashing, it has been the practice to confirm whether or not a charge indicator lamp contained in the electronic flashlight itself is turned on. This has required the photographer to turn his eyes from the viewfinder to the indicator lamp each time it was necessary to make such a confirmation. This has been only cumbersome but also could lead to a lost chance to activate the shutter. Furthermore, cameras of the type which contain electronic flashlights therein have been greater in dimensions and weight because the electronic flashlight was permanently contained within the camera, and such cameras have been rather inconvenient to use as well as expensive and uneconomical.

SUMMARY OF THE INVENTION

We have conceived means to eliminate the above-noted difficulties and disadvantages. Thus, we provide a charge indicator lamp of the glow discharge tube type contained in a camera body and a separate electronic flashlight containing therein a circuit for operating the indicator lamp, the electronic flashlight being designed for assemblage to the camera body thereby automatically to connect the charge indicator lamp with the operating circuit therefor so that a charge indicator lamp provided in the electronic flashlight is not turned on during the flashlight being assembled to the camera body.

According to the present invention, a combination of a camera and an electronic flashlight comprises a mounting member provided on the body of the camera, a mounting member provided on the electronic flashlight for engagement with the first-named mounting member removably to secure the electronic flashlight to the camera body, an indicator lamp of the glow discharge tube type provided on the camera body for indicating the readiness of the electronic flashlight for flashing, contact means provided on the electronic flashlight, and contact means provided on the camera body and connected with the indicator lamp. The two contact means may automatically be connected together upon assemblage of the electronic flashlight to the camera body electrically to connect the indicator lamp with the electronic flashlight. The indicator lamp is disposed so that it can be viewed through the viewfinder of the camera.

There has thus been outlined rather broadly the more important features of the invention in order that the detailed description thereof that follows may be better understood, and in order that the present contribution to the art may be better appreciated. There are, of course, additional features of the invention that will be described hereinafter and which will form the subject of the claims appended thereto. Those skilled in the art will appreciate that the conception upon which this disclosure is based may readily be utilized as a basis for the designing of other structures for carrying out the several purposes of the invention. It is important, therefore, that the claims be regarded as including such equivalent constructions as do not depart from the spirit and scope of the invention.

BRIEF DESCRIPTION OF THE DRAWINGS

Specific embodiments of the invention have been chosen for purposes of illustration and description, and are shown in the accompanying drawings, forming a part of the specification wherein:

FIG. 1 is a circuit diagram illustrating the present invention;

FIG. 2 is an elevational view of the electronic flashlight according to the present invention;

FIG. 3 is a bottom plan view thereof;

FIG. 4 is a side view thereof;

FIG. 5 is a fragmentary sectional view showing the synchro contact portion of the electronic flashlight;

DESCRIPTION OF THE PREFERRED EMBODIMENTS

Figure 6:
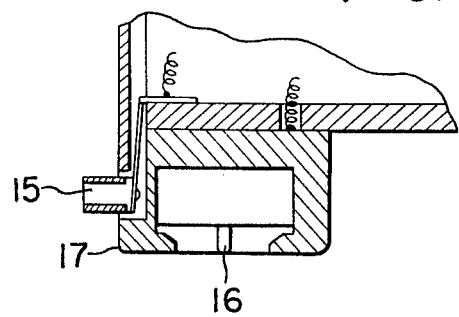
FIG. 6 is a fragmentary sectional view of the contact portion of the charge indicator lamp.

Referring to FIG. 1, description will first be made of the circuit within an electronic flashlight 18. The circuit includes a main discharge tube 1, a trigger coil 2, an open flash switch 3, trigger circuit voltage dividing resistors 4 and 5, a trigger capacitor 6, voltage dividing resistors 7, 8 and 9 for a charge indicator lamp circuit, a charge indicator lamp 10 of the glow discharge tube type contained in the electronic flashlight, a main capacitor 11, a charge protecting resistor 12, a power switch 13, a battery 14, a contact 15 for a charge indicator lamp 22 contained within a camera, and a point of connection 15' between the resistors 7 and 8 and connected with the contact 15, all connected as shown. A synchro contact 16 is connected with the synchro circuit of the camera. A grounding contact 17 is connected with the body of the camera's shoe clip, and provides a shoe for attachment to the shoe clip.

Description will now be made of the synchro circuit provided in the camera body 27 and of the charge indicator lamp circuit. A synchro contact 19 is connected with a synchro switch 24 adapted to close in response to the operation of the camera's shutter. A contact 20, connected to a charge indicator lamp 22, of the glow discharge tube type and a shoe clip 21 are grounded to the camera body through a contact 23. The charge indicator lamp 22 is contained within the camera body 27 so that it can be viewed through the camera's viewfinder. Upon assemblage of the electronic flashlight 18 to the camera body 27, the synchro contact 16 of the electronic flashlight may be connected with the synchro contact 19 of the camera, the contact 15 for the charge indicator lamp 10 in the electronic flashlight 18 may be connected with the contact 20 of the camera, and the grounding contact 17 may be connected with the contact 21 of the camera.

FIGS. 2 to 4 show the positions of the contacts 15, 16 and 17 in the electronic flashlight 18 of the present invention.

FIG. 5 illustrates the construction of the synchro circuit contact 16, which is adapted to be moved up and down by a spring 29, as required.

FIG. 6 illustrates the construction of the charge indicator lamp contact 15 and the mounting shoe 17 which also serves as the body-grounding contact.

Figure 7:
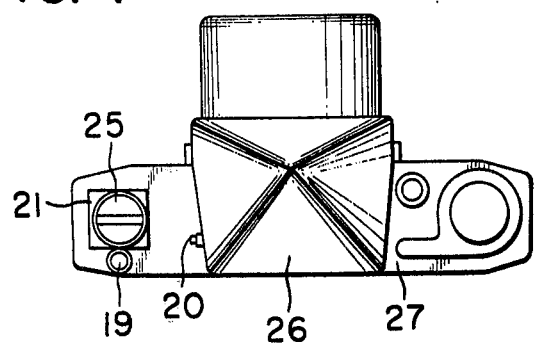
FIG. 7 is a top plan view of the camera to which the electronic flashlight of the present invention is to be assembled.

FIG. 7 particularly shows the arrangement of the camera's contacts 19, 20 and 21 on the camera body 27. The contact 19 is a no-cord synchro contact connected with the camera's synchro contact 24. The contact 20 is a charge indicator lamp contact connected with the charge indicator lamp 22 within the camera, and the contact 21 provides the shoe clip. Numeral 25 designates a film rewind knob, and numeral 26 designates the viewfinder within which the charge indicator lamp 22 or the like is contained.

Figure 8:
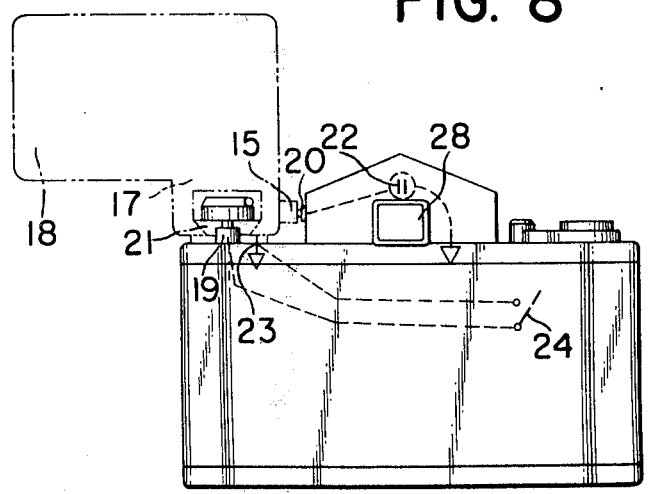
FIG. 8 is a rear view of the camera with the flashlight of the present invention assembled thereto.

FIG. 8 illustrates the manner in which the electronic flashlight is assembled to the camera body. The charge indicator lamp 22 is provided at a location such that the on and off position thereof can be visually confirmed through the viewfinder of the camera. The dots-and-dash line designates the electronic flashlight 18. The mounting shoe 17 of the flashlight 18 is engaged with the shoe clip 21 of the camera body 27 thereby to secure the electronic flashlight 18 to the camera body 27, whereby the contacts 15, 16 and 17 of the flashlight are automatically engaged with the contacts 20, 19 and 21, respectively, of the camera body.

In operation, the power switch 13 is closed to charge the main capacitor 11 from the battery 14 through the charge protecting resistor 12. When the main capacitor 11 is charged up to a predetermined voltage level, a volage divided into a predetermined voltage by the voltage dividing resistors 7, 8, 9 is applied to the charge indicator lamp 10, which is thus turned on. At the same time, a voltage divided by the trigger circuit voltage dividing resistors 4 and 5 is applied to the trigger capacitor 6. Thus, the electronic flashlight 18 is in a position where the main discharge tube 1 is ready to flash upon closing of the synchro switch 3. When the electronic flashlight 18 in such position is assembled to the camera body, the contacts 15, 16 and 17 of the flashlight are automatically engaged and connected with the associated contacts 20, 19 and 21 of the camera, respectively. As a result, the charge indicator lamp 22 in the camera is also turned on and thus, the completion of the charge in the electronic flashlight 18 can be visually confirmed through the camera's viewfinder. It will be noted that the charge indicator lamp 22 contained within the camera is parallel-connected with the voltage dividing resistors 8 and 9, so that the voltage being applied to the charge indicator lamp 10 contained in the electronic flashlight 18 is reduced to turn off the indicator lamp 10. This is useful to prevent the wasteful consumption of the battery which would result if the two lamps 10 and 22 were turned on at one time.

When the camera's shutter (not shown) is operated, the synchro switch 24 of the camera is closed to energize the main discharge tube 1. The energization of the main discharge tube causes a drop of the terminal voltage of the main capacitor 11, which thus turns off the charge indicator lamp 22 instantaneously. Thus, the flashing of the electronic flashlight can be visually confirmed through the viewfinder.

The above-described construction of the present invention leads to the following advantages:

1. The indication by the charge indicator lamp that the electronic flashlight is ready for flashing can be visually confirmed through the viewfinder of the camera;

2. Any waste of the power supply can be avoided because the assemblage of the electronic flashlight to the camera body causes the charge indicator lamp in the electronic flashlight to be automatically turned off without employing any special switch or the like; and 3. While generally, in single lens reflex cameras, the mirror remains in raised position during shutter operation so that the flashing of the electronic flashlight is difficult to confirm through the camera's viewfinder, the present invention facilitates such confirmation because the charge indicator lamp is turned off instantaneously when the flashing of the electronic flashlight is completed.

We believe that the construction and operation of our novel electronic flashlight system will now be understood, and that the advantages thereof will be fully appreciated by those persons skilled in the art.

What is claimed is:

1. The combination of a camera body and an electronic flashlight comprising:

a main discharge tube in said electronic flashlight for flashing;

a main capacitor in said electronic flashlight for discharging said main discharge tube;

a first group of contacts on said electronic flashlight;

a second group of contacts on said camera body;

a first mounting member on said electronic flashlight;

a second mounting member on said camera body removably engageable with said first mounting member to secure said electronic flashlight to said camera body;

said first and second groups of contacts being arranged for automatic connection to each other when said first and second mounting members are engaged with each other;

a first indicator lamp of the glow discharge tube type in said electronic flashlight for indicating the readiness of said electronic flashlight to flash;

a second indicator lamp of the glow discharge tube type in said camera body for indicating the readiness of said electronic flashlight to flash, said second indicator lamp being connected to two contacts of said second group;

a trigger circuit in said electronic flashlight for triggering said main discharge tube, said trigger circuit being connected in parallel with said main capacitor between ground and a battery voltage terminal;

a voltage divider circuit in said electronic flashlight, said voltage divider circuit being connected in parallel with said main capacitor, between ground and said battery voltage terminal, independently of said trigger circuit and comprising a plurality of resistors connected in series with each other;

said first indicator lamp being connected between ground and a first voltage dividing resistance location on said voltage divider circuit; and two contacts of said first group being connected between ground and a second voltage dividing resistance portion of said voltage divider circuit and said second voltage dividing resistance location has higher resistance to ground than said first voltage dividing resistance portion, whereby when said first and second groups of contacts are connected to each other to produce current flow through said second indicator lamp, the voltage across said first voltage dividing resistance is reduced to turn off the first indicator lamp.

* * * * *